(12) United States Patent
Zhou et al.

(10) Patent No.: US 11,372,098 B2
(45) Date of Patent: Jun. 28, 2022

(54) METHOD, APPARATUS, DEVICE, AND MEDIUM FOR DETERMINING ANGLE OF YAW

(71) Applicant: BAIDU ONLINE NETWORK TECHNOLOGY (BEIJING) CO., LTD., Beijing (CN)

(72) Inventors: Xun Zhou, Beijing (CN); Yuanfan Xie, Beijing (CN); Shirui Li, Beijing (CN); Liang Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 392 days.

(21) Appl. No.: 16/550,442

(22) Filed: Aug. 26, 2019

(65) Prior Publication Data
US 2020/0081113 A1 Mar. 12, 2020

(30) Foreign Application Priority Data
Sep. 12, 2018 (CN) .......................... 201811063981.9

(51) Int. Cl.
*G01S 13/58* (2006.01)
*G01S 13/60* (2006.01)
(Continued)

(52) U.S. Cl.
CPC ............. *G01S 13/589* (2013.01); *G01S 7/411* (2013.01); *G01S 13/60* (2013.01); *G01S 13/931* (2013.01)

(58) Field of Classification Search
CPC ........ G01S 13/46; G01S 7/292; G01S 7/2955; G01S 13/56; G01S 13/68; G01S 13/937;
(Continued)

(56) References Cited

U.S. PATENT DOCUMENTS

2013/0218398 A1* 8/2013 Gandhi ................. G01S 13/931
701/31.1
2016/0223661 A1* 8/2016 Song ....................... G01S 13/86
(Continued)

FOREIGN PATENT DOCUMENTS

CN 107179530 A 9/2017
CN 107226089 A 10/2017
(Continued)

OTHER PUBLICATIONS

Japanese Patent Application No. 2019-165522 Office Action dated Nov. 4, 2020, 4 pages.
(Continued)

*Primary Examiner* — Donald H B Braswell
(74) *Attorney, Agent, or Firm* — Lathrop GPM LLP

(57) ABSTRACT

Embodiments of the present disclosure provide a method, an apparatus, a device, and a medium for determining an angle of yaw, relating to a field of automatic driving. The method includes: obtaining, during a vehicle being driving straightly on a straight road, data of each obstacle in an environment located by the vehicle, the data of each obstacle being detected by a millimeter wave radar sensor located in the vehicle, at least one metal obstacle being provided on the straight road; recognizing the metal obstacle based on the data of each obstacle, and obtaining a metal obstacle line by fitting positions of the metal obstacle at different time points; and determining an angle between the metal obstacle line and a direction of a vehicle body as an angle of yaw between the millimeter wave radar sensor and the vehicle body.

15 Claims, 2 Drawing Sheets

(51) Int. Cl.
*G01S 7/41* (2006.01)
*G01S 13/931* (2020.01)

(58) Field of Classification Search
CPC ...... G01S 7/414; G01S 13/426; G01S 13/726; G01S 7/415; G01S 13/72
See application file for complete search history.

(56) References Cited

U.S. PATENT DOCUMENTS

| | | | |
|---|---|---|---|
| 2018/0024228 A1* | 1/2018 | Schiffmann | G01S 7/415 342/174 |
| 2018/0045811 A1* | 2/2018 | Cao | G01S 7/4026 |
| 2019/0080612 A1* | 3/2019 | Weissman | G08G 1/164 |

FOREIGN PATENT DOCUMENTS

| | | |
|---|---|---|
| CN | 207114749 U | 3/2018 |
| DE | 102008041761 A1 | 3/2010 |
| EP | 1533627 A1 | 5/2005 |
| JP | 2004198159 A | 7/2004 |
| JP | 2011002346 A | 1/2011 |
| JP | 2016043700 A | 4/2016 |
| JP | 2018100899 A | 6/2018 |

OTHER PUBLICATIONS

Japanese Patent Application No. 2019-165522 English translation of Office Action dated Nov. 4, 2020, 4 pages.
Chinese Patent Application No. 201811063981.9 Office Action dated May 6, 2020, 4 pages.
Chinese Patent Application No. 201811063981.9 English translation of Office Action dated May 6, 2020, 4 pages.
Liu, Z. et al., "A Study on the Control Strategy for Rear-end Collision Avoidance Based on Drivers' Behavior" Automotive Engineering, vol. 39, No. 9, Nov. 7, 2017, 7 pages.
Visentin, T. et al., "Polarimetric RCS Measurements of Selected Two-Wheeled Vehicles for Automotive Radar" Proceedings of the 14th European Radar Conference, Jan. 8, 2018, 4 pages.
European Patent Application No. 19190966.2 extended Search and Opinion dated Nov. 15, 2019, 8 pages.

\* cited by examiner

METHOD, APPARATUS, DEVICE, AND MEDIUM FOR DETERMINING ANGLE OF YAW

CROSS-REFERENCE TO RELATED APPLICATIONS

This application is based upon and claims priority to Chinese Patent Application No. 201811063981.9, filed on Sep. 12, 2018, the entire contents of which are incorporated herein by reference.

FIELD

Embodiments of the present disclosure relate to a field of automatic driving, and more particularly to a method, an apparatus, a device, and a medium for determining an angle of yaw.

BACKGROUND

A millimeter wave radar sensor is one of common sensors in an ADAS (advanced driving assistant system) and a field of automatic driving.

A scope detected by a conventional millimeter wave radar sensor may be understood as a cone. In some applications, it is required a high accuracy only for an angle of yaw of the millimeter wave radar sensor.

SUMMARY

In a first aspect, embodiments of the present disclosure provide a method for determining an angle of yaw. The method includes: obtaining, during a vehicle being driving straightly on a straight road, data of each obstacle in an environment located by the vehicle, the data of each obstacle being detected by a millimeter wave radar sensor located in the vehicle, at least one metal obstacle being provided on the straight road; recognizing the metal obstacle based on the data of each obstacle, and obtaining a metal obstacle line by fitting positions of the metal obstacle at different time points; and determining an angle between the metal obstacle line and a direction of a vehicle body as an angle of yaw between the millimeter wave radar sensor and the vehicle body.

In a second aspect, embodiments of the present disclosure also provide a device. The device includes one or more processors, a millimeter wave radar sensor, and a storage apparatus. The millimeter wave radar sensor is configured to detect data of each obstacle in an environment located by a vehicle. The storage apparatus is configured to store one or more programs. When the one or more programs are executed by the one or more processors, the one or more processors are caused to implement the above method for determining an angle of yaw.

In a third aspect, embodiments of the present disclosure also provide a computer readable storage medium having a computer program stored thereon. The computer program is configured to implement the above method for determining an angle of yaw.

DETAILED DESCRIPTION

Detailed description will be further made below to the present disclosure with reference to the accompanying drawings and the embodiments. Detailed embodiments described herein are intended only to explain the present disclosure, and are not intended to limit the present disclosure. In addition, it should be also noted that, for the convenience of description, only some contents but not all the structure related to the present disclosure are illustrated in the accompanying drawings.

Embodiment 1

Figure 1:
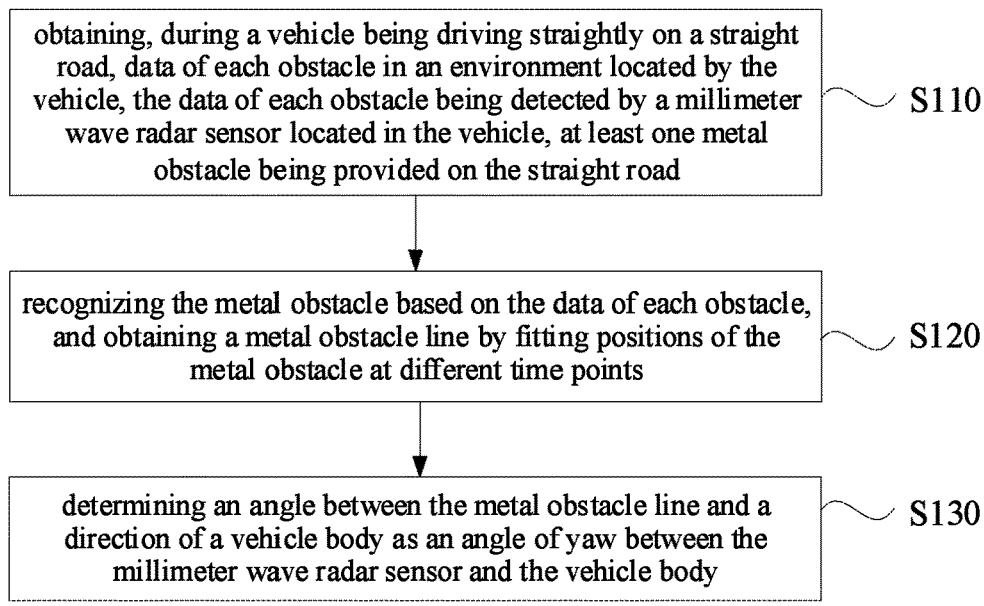
FIG. 1 is a flow chart illustrating a method for determining an angle of yaw provided in an embodiment of the present disclosure.

FIG. 1 is a flow chart illustrating a method for determining an angle of yaw provided in Embodiment 1 of the present disclosure. This embodiment may be applicable to a case where an angle of yaw between a millimeter wave radar sensor and a vehicle body needs to be determined, typically, applicable to a case where calibration is performed on an installation position of the millimeter wave radar sensor in the vehicle. The method may be executed by an apparatus for determining an angle of yaw. The apparatus may be implemented in form of software and/or hardware. As illustrated in FIG. 1, the method provided in this embodiment includes acts in the following blocks.

At block S110, during a vehicle being driving straightly on a straight road, data of each obstacle in an environment located by the vehicle is obtained. The data of each obstacle is detected by a millimeter wave radar sensor located in the vehicle. At least one metal obstacle is provided on the straight road.

The data of the obstacle includes a position of the obstacle in a millimeter wave radar coordinate system, a velocity of the obstacle relative to the vehicle, and a reflection intensity of the obstacle.

The reflection intensity is an intensity configured to describe a signal fed back after transmitting a microwave signal to the obstacle.

The metal obstacle may be a metal public facility provided beside the straight road regularly, such as a metal guardrail, a metal roadblock, a lamp-post of a street lamp, and a metal garbage can. The metal obstacle is a target obstacle to be recognized.

At block S120, the metal obstacle is recognized based on the data of each obstacle, and a metal obstacle line is obtained by fitting positions of the metal obstacle at different time points.

In detail, the metal obstacle is recognized from the data of the obstacles based on data characteristic of the metal obstacle in the millimeter wave radar coordinate system.

Typically, the metal obstacle is recognized based on at least one of: a velocity of each obstacle relative to the vehicle, a reflection intensity of each obstacle, a position of each obstacle in the millimeter wave radar coordinate system, and a density degree of each obstacle in the millimeter wave radar coordinate system.

The metal obstacle is resting, while the millimeter wave radar sensor installed in the vehicle takes the vehicle in a motion state as a reference. Therefore, a size of a velocity of the metal obstacle collected by the millimeter wave radar sensor relative to the vehicle is equal to a size of a velocity of the vehicle, and a motion direction of the metal obstacle relative to the vehicle is opposite to an actual motion direction of the vehicle. In this way, an obstacle in a resting mode is selected by the velocity of the obstacle relative to the vehicle (the velocity is a vector, including a size of the velocity and a motion direction of the velocity).

The millimeter wave radar has a great reflection intensity for metal (i.e. sensitivity), such that an obstacle made of metal material may be selected.

After projecting the obstacle to the millimeter wave radar coordinate system, position characteristic of the obstacle may be recognized by a position of the obstacle in the millimeter wave radar coordinate system. The position characteristic may be a relationship between the obstacle and the road. For example, a distance between the obstacle and a road edge is within a preset scope of edge distances, or a distance between the obstacle and a center of the road is within a preset scope of center distances.

Therefore, the metal obstacle may be selected based on the position characteristic of the obstacle in the millimeter wave radar coordinate system, i.e., an actual relationship between the metal obstacle and the road.

When there are a plurality of metal obstacles, the plurality of metal obstacles may present a certain density degree in the millimeter wave radar coordinate system. Therefore, the metal obstacle may be recognized based on the density degree of the obstacles.

In detail, a position of the metal obstacle at a time point may be represented by a point, and positions of the metal obstacle at different time points may be represented by a plurality of points. Based on an existing line fitting algorithm, fitting may be performed on a metal obstacle line according to the plurality of points. For example, the line fitting algorithm may be a least square method.

At block S130, an angle between the metal obstacle line and a direction of a vehicle body is determined as an angle of yaw between the millimeter wave radar sensor and the vehicle body.

The direction of the vehicle body may be determined based on the motion direction of the vehicle.

In detail, determination of the direction of the vehicle body may include: taking a velocity direction of the metal obstacle relative to the vehicle as an opposite direction of a vehicle velocity, and determining the direction of the vehicle body based on the opposite direction of the vehicle velocity.

With embodiments of the present disclosure, at least one metal obstacle provided in the road is recognized based on the data of each obstacle detected by the millimeter wave radar sensor in the vehicle, and then the angle between the fitted metal obstacle line and the direction of the vehicle body is taken as the angle of yaw between the millimeter wave radar sensor and the vehicle body, thus implementing the determination of the angle of yaw between the millimeter wave sensor and the vehicle body.

In addition, the metal obstacle is the metal public facility provided beside the straight road regularly, such that calibration cost of the millimeter wave radar sensor in the vehicle may be reduced.

Embodiment 2

Figure 2:
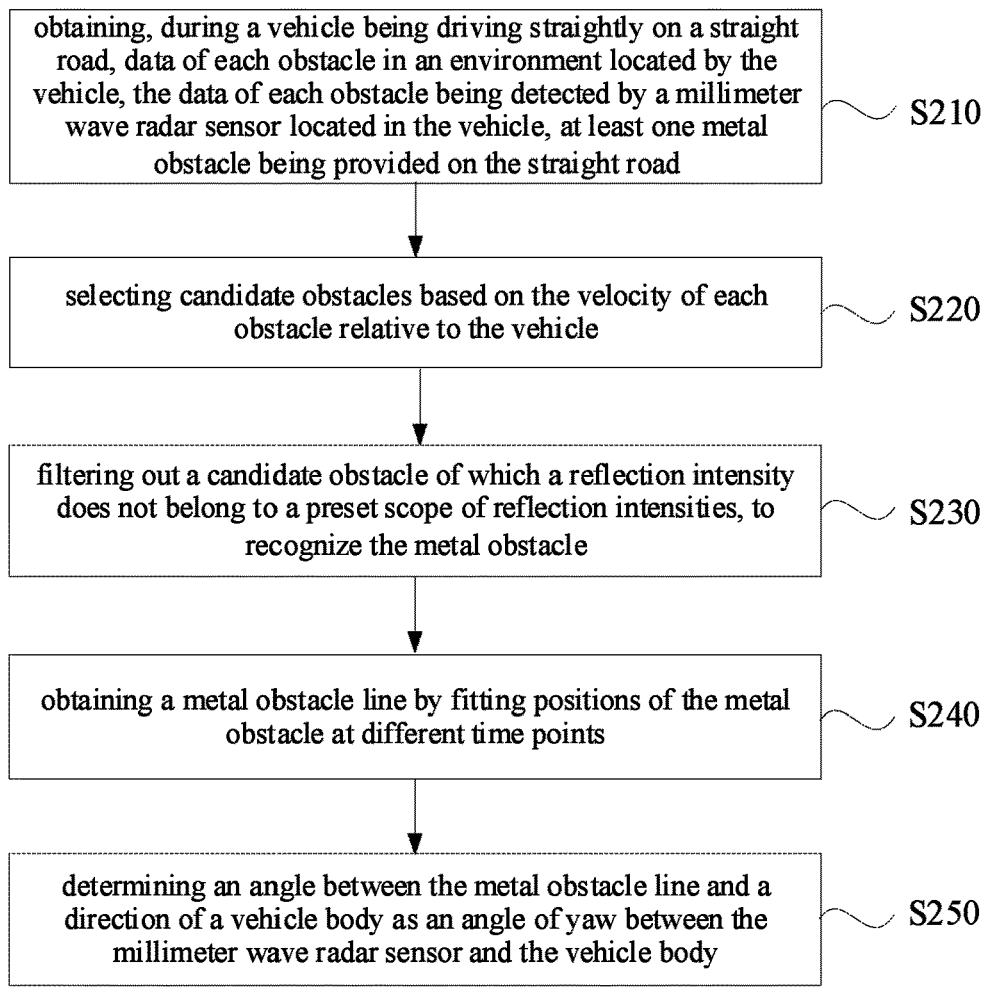
FIG. 2 is a flow chart illustrating a method for determining an angle of yaw provided in an embodiment of the present disclosure.

FIG. 2 is a flow chart illustrating a method for determining an angle of yaw provided in Embodiment 2 of the present disclosure. This embodiment is an alternative solution provided based on the above embodiment. Referring to FIG. 2, the method provided in this embodiment includes acts in the following blocks.

At block S210, during a vehicle being driving straightly on a straight road, data of each obstacle in an environment located by the vehicle is obtained. The data of each obstacle is detected by a millimeter wave radar sensor located in the vehicle. At least one metal obstacle is provided on the straight road.

At block S220, based on the obtained data of each obstacle, candidate obstacles are selected based on the velocity of each obstacle relative to the vehicle.

Since the metal obstacle is resting, a size of a velocity of the metal obstacle relative to the vehicle in a motion state is equal to a size of a velocity of the vehicle, and directions of the two velocities are opposite. Therefore, by screening based on the velocity, some non-target obstacles may be eliminated.

In detail, a filtering method for the candidate obstacles may be determined based on an actual condition.

In a case where the vehicle velocity may be determined accurately, an obstacle having an equal size of the velocity and an opposite velocity direction relative to the vehicle may be taken as the candidate obstacle.

In a case where the vehicle velocity may not be determined accurately, an obstacle of which the size of the velocity relative to the vehicle is within a preset velocity scope, and having an opposite velocity direction relative to the vehicle may be taken as the candidate obstacle.

The preset velocity scope may be determined based on the vehicle velocity.

In a case where the vehicle velocity may not be determined, an obstacle of which the velocity direction relative to the vehicle is equal to the velocity direction of the vehicle is filtered out, and the remaining obstacles are taken as the candidate obstacles.

During the vehicle drives, the velocity direction of the vehicle is towards the front, an absolute value of a motion velocity of a resting obstacle relative to the vehicle is greater than 0, and the velocity direction of the resting obstacle is opposite to the motion direction of the vehicle. Therefore, when it is assumed that driving towards the front is positive, and driving towards the back is negative, the motion velocity of the resting obstacle relative to the vehicle must be lower than 0 during the vehicle drives towards the front (that is because the velocity direction of the resting obstacle relative to the vehicle is towards the back). Therefore, an obstacle of which a velocity vector is greater than or equal to 0 is filtered out, such that the obstacle of which the velocity direction relative to the vehicle is equal to the velocity direction of the vehicle is filtered out, thus implementing screening for target obstacles.

At block S230, a candidate obstacle of which a reflection intensity does not belong to a preset scope of reflection intensities is filtered out, to recognize the metal obstacle.

The scope of the reflection intensities may be provided according to a reflection intensity of the millimeter wave radar sensor for the metal.

Based on the characteristic that the millimeter wave radar sensor has a great reflection intensity for metal, the metal obstacle is recognized from the candidate obstacles according to reflection intensities of the candidate obstacles.

At block S240, a metal obstacle line is obtained by fitting positions of the metal obstacle at different time points.

At block S250, an angle between the metal obstacle line and a direction of the vehicle body is determined as an angle of yaw between the millimeter wave radar sensor and the vehicle body.

With the technical solution in embodiments of the present disclosure, the obstacle of which the velocity relative to the vehicle is not equal to 0 is taken as the candidate obstacle, and then the metal obstacle is recognized from the candidate obstacles according to the reflection intensity. It is easy to obtain the velocity of the obstacle relative to the vehicle and the reflection intensity of the obstacle. Therefore, the recognition process based on the velocity of the obstacle relative to the vehicle and the reflection intensity of the obstacle not only improves the recognition accuracy, but also improves the recognition speed.

For further improving the recognition accuracy of the metal obstacle, after filtering out the candidate obstacle of which the reflection intensity does not belong to the preset scope of reflection intensities, to recognize the metal obstacle, the method also includes: filtering the remaining candidate obstacles based on the positions of the candidate obstacles and the density degrees of the candidate obstacles, to obtain the metal obstacle.

It should be illustrated that, with the technical guiding of this embodiments, the skilled in the art may be motivated to combine any implementation described in the above embodiments, to implement the determination for the angle of yaw between the millimeter wave radar sensor and the vehicle body.

Embodiment 3

Figure 3:
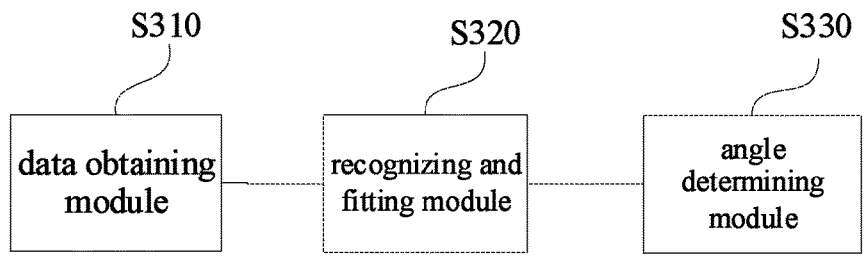
FIG. 3 is a block diagram illustrating an apparatus for determining an angle of yaw provided in an embodiment of the present disclosure.

FIG. 3 is a block diagram illustrating an apparatus for determining an angle of yaw provided in Embodiment 3 of the present disclosure. Referring to FIG. 3, the apparatus provided in this embodiment includes: a data obtaining module S310, a recognizing and fitting module S320 and an angle determining module S330.

The data obtaining module S310 is configured to obtain, during a vehicle being driving straightly on a straight road, data of each obstacle in an environment located by the vehicle, the data of each obstacle being detected by a millimeter wave radar sensor located in the vehicle, at least one metal obstacle being provided on the straight road.

The recognizing and fitting module S320 is configured to recognize the metal obstacle based on the data of each obstacle, and to obtain a metal obstacle line by fitting positions of the metal obstacle at different time points.

The angle determining module S330 is configured to determine an angle between the metal obstacle line and a direction of a vehicle body as an angle of yaw between the millimeter wave radar sensor and the vehicle body.

With embodiments of the present disclosure, at least one metal obstacle provided in the road is recognized based on the data of each obstacle detected by the millimeter wave radar sensor in the vehicle, and then the angle between the fitted metal obstacle line and the direction of the vehicle body is taken as the angle of yaw between the millimeter wave radar sensor and the vehicle body, thus implementing the determination of the angle of yaw between the millimeter wave sensor and the vehicle body.

Further, the recognizing and fitting module includes: an obstacle recognizing unit.

The obstacle recognizing unit is configured to recognize the metal obstacle based on at least one of: a velocity of each obstacle relative to the vehicle, a reflection intensity of each obstacle, a position of each obstacle in a millimeter wave radar coordinate system, and a density degree of each obstacle in the millimeter wave radar coordinate system.

Further, the obstacle recognizing unit is configured to: select candidate obstacles based on the velocity of each obstacle relative to the vehicle; and filter out a candidate obstacle of which a reflection intensity does not belong to a preset scope of reflection intensities, to recognize the metal obstacle.

Further, the apparatus also includes: an obstacle filtering module.

The obstacle filtering module is configured to filter remaining candidate obstacles based on the positions of the candidate obstacles and the density degrees of the candidate obstacles, to obtain the metal obstacle after filtering out the candidate obstacle of which the reflection intensity does not belong to the preset scope of reflection intensities.

Further, the apparatus also includes: a velocity direction determining module and a vehicle direction determining module.

The velocity direction determining module is configured to determine a velocity direction of the metal obstacle relative to the vehicle as an opposite direction of a vehicle velocity before determining the angle between the metal obstacle line and the direction of the vehicle body.

The vehicle direction determining module is configured to determine the direction of the vehicle body according to the opposite direction of the vehicle velocity.

Embodiment 4

Figure 4:
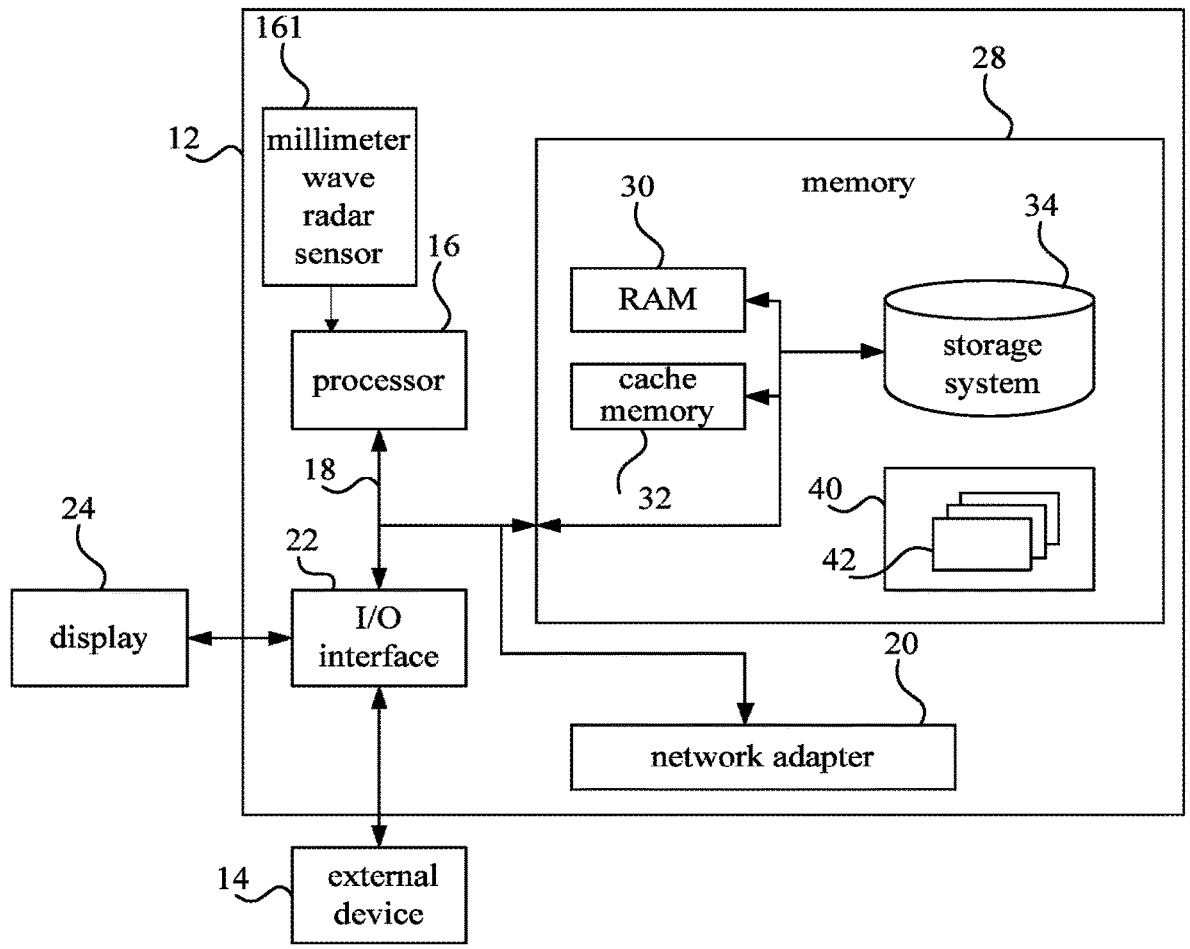
FIG. 4 is a block diagram illustrating a device provided in an embodiment of the present disclosure.

FIG. 4 is a block diagram illustrating a device provided in Embodiment 4 of the present disclosure. FIG. 4 illustrates a block diagram of an exemplary device 12 applicable to implement embodiments of the present disclosure. The device 12 illustrated in FIG. 4 is only an example, which may not bring any limitation to functions and scope of embodiments of the present disclosure.

As illustrated in FIG. 4, the device 12 is presented in form of a general-purpose computing device. Components of the device 12 may include but be not limited to: one or more processors or processing units 16, a system storage 28, and a bus 18 connecting different system components (including the system storage 28 and the processing unit 16). The processing unit 16 connects to a millimeter wave radar sensor 161. The sensor is configured to detect data of each obstacle in an environment located by a vehicle. The millimeter wave radar sensor 161 may be provided outside the device 12, and may also be provided inside the device 12 (this embodiment takes that the millimeter wave radar sensor is provided inside the device 12 as an example for illustration).

The bus 18 represents one or more of several bus structures, including a storage bus or a local bus with any bus structure in the plurality of bus structures and being employed by a storage controller, a peripheral bus, an accelerated graphics port and a processor. For example, these architectures include but are not limited to an industry standard architecture (ISA) bus, a micro channel architecture (MCA) bus, an enhanced ISA bus, a video electronics standards association (VESA) local bus and a peripheral component interconnection (PCI) bus.

The device 12 typically includes a plurality of computer system readable mediums. These mediums may be any usable medium that may be accessed by the device 12, including volatile and non-volatile mediums, removable and non-removable mediums.

The system storage 28 may include computer system readable mediums in the form of volatile medium, such as a random-access memory (RAM) 30 and/or a cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected to the bus 18 by one or more data medium interfaces. The storage 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the storage 28. Such program modules 42 include but are not limited to an operating system, one or more application programs, other program modules, and program data. Each or any combination of these examples may include an implementation of a networking environment. The program module 42 usually executes functions and/or methods described in embodiments of the present disclosure.

The device 12 may communicate with one or more external devices 14 (such as a keyboard, a pointing device, and a display 24), may also communicate with one or more devices enabling a user to interact with the device 12, and/or may communicate with any device (such as a network card, and a modem) enabling the device 12 to communicate with one or more other computing devices. Such communication may occur via an input/output (I/O) interface 22. Moreover, the device 12 may further communicate with one or more networks (such as local area network (LAN), wide area network (WAN) and/or public network, such as Internet) via a network adapter 20. As illustrated in FIG. 4, the network adapter 20 communicates with other modules of the device 12 via the bus 18. It should be understood that, although not illustrated in FIG. 4, other hardware and/or software modules may be used in combination with the device 12, including but being not limited to: microcode, device drivers, redundant processing units, external disk drive arrays, RAID (redundant array of independent disks) systems, tape drives, and data backup storage systems, etc.

The processor 16, by operating programs stored in the system storage 28, executes various function applications and data processing, for example implements a method for determining an angle of yaw provided in embodiments of the present disclosure.

Embodiment 5

Embodiment 5 of the present disclosure also provides a computer readable storage medium having a computer program stored thereon. When executed by a computer processor, the computer program is configured to implement the method for determining an angle of yaw according to any of embodiments of the present disclosure. The method includes:

obtaining, during a vehicle being driving straightly on a straight road, data of each obstacle in an environment located by the vehicle, the data of each obstacle being detected by a millimeter wave radar sensor located in the vehicle, at least one metal obstacle being provided on the straight road;

recognizing the metal obstacle based on the data of each obstacle, and obtaining a metal obstacle line by fitting positions of the metal obstacle at different time points; and determining an angle between the metal obstacle line and a direction of a vehicle body as an angle of yaw between the millimeter wave radar sensor and the vehicle body.

The computer storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a specific illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for determining an angle of yaw, comprising:
   obtaining, by one or more computing device, during a vehicle being driving straightly on a straight road, data of each obstacle in an environment located by the vehicle, the data of each obstacle being detected by a millimeter wave radar sensor located in the vehicle, at least one metal obstacle being provided on the straight road;
   recognizing, by the one or more computing device, the metal obstacle based on the data of each obstacle and a reflection intensity of each obstacle;
   obtaining, by the one or more computing device, a metal obstacle line by fitting positions of the metal obstacle at different time points; and
   determining, by the one or more computing device, an angle between the metal obstacle line and a direction of a vehicle body as an angle of yaw between the millimeter wave radar sensor and the vehicle body.

2. The method of claim 1, wherein, recognizing, by the one or more computing device, the metal obstacle based on the data of each obstacle comprises:
   recognizing, by the one or more computing device, the metal obstacle based on at least one of: a velocity of each obstacle relative to the vehicle, a position of each obstacle in a millimeter wave radar coordinate system, and a density degree of each obstacle in the millimeter wave radar coordinate system.

3. The method of claim 1, wherein, recognizing, by the one or more computing device, the metal obstacle based on the data of each obstacle comprises:
   selecting, by the one or more computing device, candidate obstacles based on a velocity of each obstacle relative to the vehicle; and
   filtering out, by the one or more computing device, a candidate obstacle of which a reflection intensity does not belong to a preset scope of reflection intensities, to recognize the metal obstacle.

4. The method of claim 3, further comprising:
   filtering, by the one or more computing device, remaining candidate obstacles based on the positions of the candidate obstacles and the density degrees of the candidate obstacles, to obtain the metal obstacle.

5. The method of claim 1, further comprising:
   determining, by the one or more computing device, a velocity direction of the metal obstacle relative to the vehicle as an opposite direction of a vehicle velocity; and
   determining, by the one or more computing device, the direction of the vehicle body according to the opposite direction of the vehicle velocity.

6. An electronic device, comprising:
   one or more processors;
   a millimeter wave radar sensor, configured to detect data of each obstacle in an environment located by a vehicle; and
   a storage apparatus, configured to store one or more programs;
   wherein, when the one or more programs are executed by the one or more processors, the one or more processors are caused to implement;
   obtaining during a vehicle being driving straightly on a straight road, data of each obstacle in an environment located by the vehicle, the data of each obstacle being detected by a millimeter wave radar sensor located in the vehicle, at least one metal obstacle being provided on the straight road;
   recognizing the metal obstacle based on the data of each obstacle and a reflection intensity of each obstacle;
   obtaining a metal obstacle line by fitting positions of the metal obstacle at different time points; and
   determining an angle between the metal obstacle line and a direction of a vehicle body as an angle of yaw between the millimeter wave radar sensor and the vehicle body.

7. The electronic device of claim 6, wherein, recognizing the metal obstacle based on the data of each obstacle comprises:
   recognizing the metal obstacle based on at least one of: a velocity of each obstacle relative to the vehicle, a position of each obstacle in a millimeter wave radar coordinate system, and a density degree of each obstacle in the millimeter wave radar coordinate system.

8. The electronic device of claim 6, wherein, recognizing the metal obstacle based on the data of each obstacle comprises:
   selecting candidate obstacles based on a velocity of each obstacle relative to the vehicle; and
   filtering out a candidate obstacle of which a reflection intensity does not belong to a preset scope of reflection intensities, to recognize the metal obstacle.

9. The electronic device of claim 8, wherein, when the one or more programs are executed by the one or more processors, the one or more processors are caused to further implement:
   filtering remaining candidate obstacles based on the positions of the candidate obstacles and the density degrees of the candidate obstacles, to obtain the metal obstacle.

10. The electronic device of claim 6, wherein, when the one or more programs are executed by the one or more processors, the one or more processors are caused to further implement:
    determining a velocity direction of the metal obstacle relative to the vehicle as an opposite direction of a vehicle velocity; and
    determining the direction of the vehicle body according to the opposite direction of the vehicle velocity.

11. A non-transient computer readable storage medium having a computer program stored thereon, wherein, the computer program is configured to implement a method for determining an angle of yaw when executed by a processor, the method comprising:
    obtaining during a vehicle being driving straightly on a straight road, data of each obstacle in an environment located by the vehicle, the data of each obstacle being detected by a millimeter wave radar sensor located in the vehicle, at least one metal obstacle being provided on the straight road;

recognizing the metal obstacle based on the data of each obstacle and a reflection intensity of each obstacle;

obtaining a metal obstacle line by fitting positions of the metal obstacle at different time points; and determining an angle between the metal obstacle line and a direction of a vehicle body as an angle of yaw between the millimeter wave radar sensor and the vehicle body.

12. The non-transient computer readable storage medium of claim 11, wherein, recognizing the metal obstacle based on the data of each obstacle comprises:

recognizing the metal obstacle based on at least one of: a velocity of each obstacle relative to the vehicle, a position of each obstacle in a millimeter wave radar coordinate system, and a density degree of each obstacle in the millimeter wave radar coordinate system.

13. The non-transient computer readable storage medium of claim 11, wherein, recognizing the metal obstacle based on the data of each obstacle comprises:

selecting candidate obstacles based on a velocity of each obstacle relative to the vehicle; and filtering out a candidate obstacle of which a reflection intensity does not belong to a preset scope of reflection intensities, to recognize the metal obstacle.

14. The non-transient computer readable storage medium of claim 13, wherein, the method further comprises:

filtering remaining candidate obstacles based on the positions of the candidate obstacles and the density degrees of the candidate obstacles, to obtain the metal obstacle.

15. The non-transient computer readable storage medium of claim 11, wherein, the method further comprises:

determining a velocity direction of the metal obstacle relative to the vehicle as an opposite direction of a vehicle velocity; and determining the direction of the vehicle body according to the opposite direction of the vehicle velocity.

* * * * *